Sept. 29, 1959      J. A. O'BRYAN      2,906,051
ARTIFICIAL LURE FOR FISH
Filed July 2, 1958      2 Sheets-Sheet 1
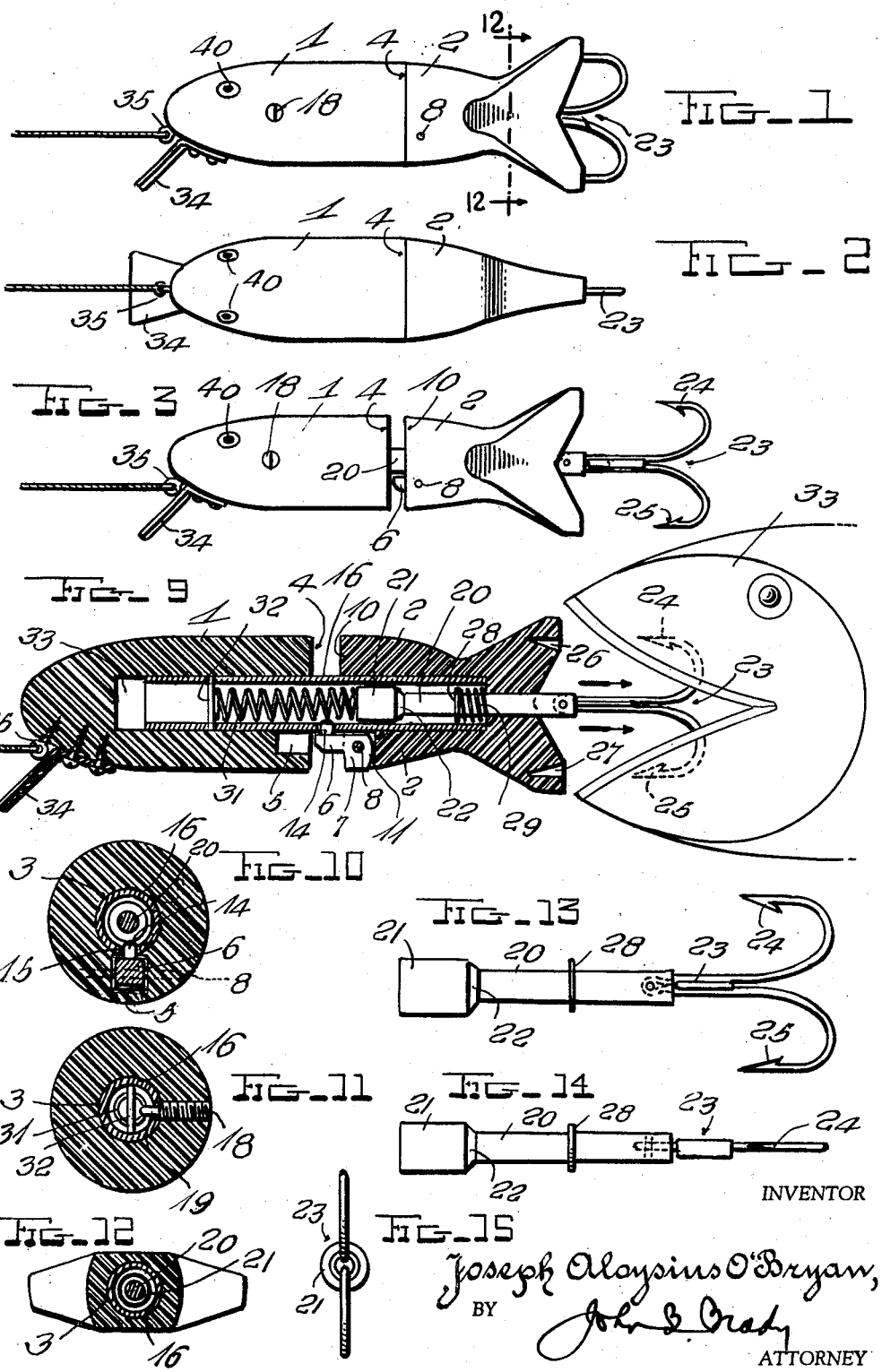
INVENTOR
Joseph Aloysius O'Bryan,
BY
John B. Brady
ATTORNEY

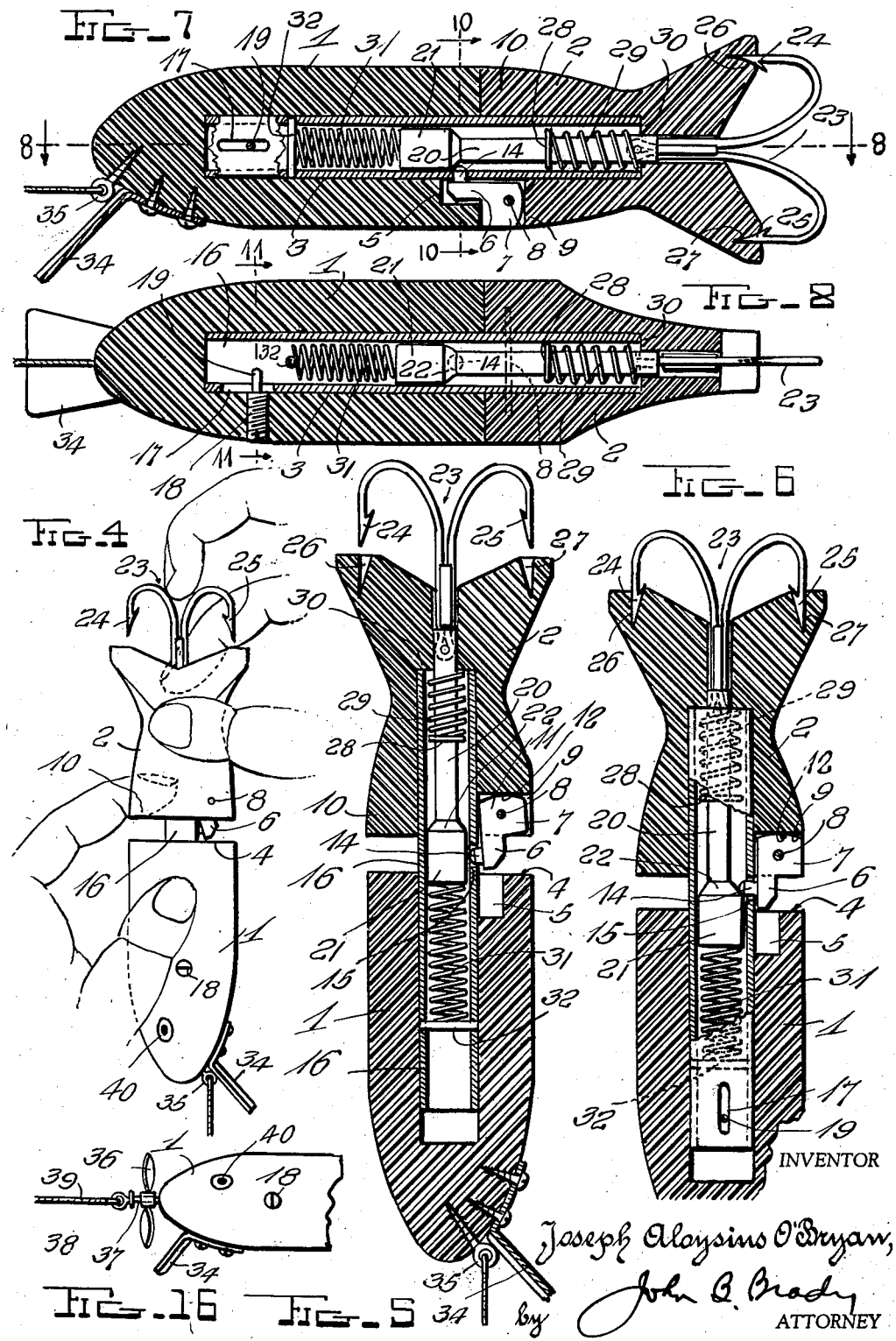

United States Patent Office 2,906,051
Patented Sept. 29, 1959

2,906,051

ARTIFICIAL LURE FOR FISH

Joseph Aloysius O'Bryan, Somerset, Ky.

Application July 2, 1958, Serial No. 746,144

5 Claims. (Cl. 43—35)

My invention relates broadly to artificial lures for fish and particularly a construction of lure containing spring actuated means for projecting the hooks of the lure into the mouth of the fish for ensnaring the fish when the fish bite at the lure.

One of the objects of my invention is to provide a construction of artificial lure for fish containing a spring actuated mechanism for projecting the hook of the lure into the mouth of the fish as the fish bites at the lure for positively ensnaring the fish.

Another object of my invention is to provide a construction of artificial lure for fish containing latching means for normally latching the hook of the lure in a protected position with respect to the body of the lure in association with release means operative upon conditions where the fish bite at the lure for unlatching the hook and rendering effective the projection of the hook to ensnare the mouth of the fish under control of spring means contained within the body of the lure.

Still another object of my invention is to provide an assembly of differential springs within the body structure of an artificial lure for fish where the springs act successively upon a central plunger connected with the fish hook for rearwardly projecting the fish hook and effecting a recoil movement thereof for positively ensnaring a fish biting at the lure.

A further object of my invention is to provide an arrangement of spaced springs within the body structure of an artificial lure for fish for successively acting upon a fish hook whereby the fish hook is rearwardly projected under conditions where a fish tugs at the rear of the lure and the fish hook then reversed in its movement for ensnaring the fish as the fish tends to withdraw from the lure.

Other and further objects of my invention reside in the construction of an artificial lure for fish containing successively operating spring means coacting to control the projection and recoil of a fish hook as set forth more fully in the specification hereinafter following by reference to the accompanying drawings in which:

Fig. 1 is a side elevational view of the artificial fish lure of my invention in its original protected or cocked position ready for use in trolling operations without entanglement or interference with seaweed or other obstructions near the bottom of the waterbed;

Fig. 2 is a top plan view of the artificial fish lure shown in Fig. 1;

Fig. 3 is a side elevational view showing the artificial fish lure in uncocked position where the fish has tugged at the tail of the lure and caused an unlatching of the fish hook, the view showing the fish hook propelled or projected rearwardly of the lure for ensnaring the mouth of the fish;

Fig. 4 is a view illustrating the artificial lure as shown in Fig. 3 being moved to cocked position with the fish hook being stowed in protected position in pockets in the tail of the body of the lure;

Fig. 5 is a longitudinal sectional view through the artificial fish lure showing the initial step in the projection of the fish hook rearwardly from the tail section of the lure for ensnaring the fish tugging at the tail section of the lure;

Fig. 6 is a view similar to the view shown in Fig. 5 but illustrating the action of the recoil spring in reversing the direction of movement of the hook and tending to restore the hook in the direction of the tail section of the lure;

Fig. 7 is a longitudinal cross-sectional view through the lure similar to the view shown in Figs. 5 and 6 but illustrating the recoil spring at the end of the recoil action and also showing the manner in which the tail section is pushed into latching position with respect to the head section preparatory to a repeat operation of the lure;

Fig. 8 is a horizontal sectional view taken longitudinally of the lure on line 8—8 of Fig. 7;

Fig. 9 illustrates the operating position of the lure of my invention where the fish has bitten at the tail section of the lure effecting a projection of the hook into the mouth of the fish and wherein the recoil spring is about to become effective to reverse the direction of movement of the fish hook and more positively ensnare the fish;

Fig. 10 is a transverse sectional view on line 10—10 of Fig. 7;

Fig. 11 is a transverse sectional view on line 11—11 of Fig. 8;

Fig. 12 is a transverse sectional view on line 12—12 of Fig. 1;

Fig. 13 is a side elevational view of the plunger and hook on an enlarged scale;

Fig. 14 is a top plan view of the plunger and hook shown in Fig. 13;

Fig. 15 is an end view of the hook and plunger shown in Figs. 13 and 14; and

Fig. 16 is a fragmentary view of a modified form of artificial lure embodying my invention and showing the front end of the lure equipped with a propeller for giving the lure more action for surface and shallow water fishing.

My invention is directed to an artificial lure for fish which is capable of operation in trolling and also in surface and shallow water fishing for positively ensnaring the fish which bite at the tail of the lure. The lure of my invention is inexpensively produced on a mass production scale by reason of the fact that the principal parts are molded from plastic. I provide a head and tail section for the lure which are axially aligned for forming a streamlined body within which there is located a spring assembly consisting of a pair of springs arranged in spaced positions and associated with a central plunger, the rearward end of which carries a fish hook. One of the springs is effective to project the plunger rearwardly under conditions where a fish tugs at the tail section of the lure for projecting the hook into the mouth of the fish while the other spring is effective as a recoil spring to reverse the direction of the hook and move the plunger and hook forwardly for ensnaring the mouth of the fish for positively entrapping the fish with respect to the lure. The two molded parts of the body of the lure coact with each other where one of these parts contains a pivotally mounted bell-crank device having one lever arm longer than the other and adapted to slideably fit within a recess within the other of the molded parts, where the longer lever arm carries a detent operative to engage or release a slideable tube operative within the head portion of the molded parts. The slideable tube has limited longitudinal displacement with respect to the head portion of the body structure but sufficient to allow the detent to move outwardly with respect to an aperture in the wall of the side of the tube and out of latching position with respect to the central plunger so that the central plunger may be freed when the two molded parts of the body structure have moved apart to enable one of the springs in the spring assembly to rearwardly project the plunger and the hook associated therewith for shooting the hook out of protective engagement with the end of the tail section of the lure and into the mouth of the fish. As the plunger reaches the limit of its rearward projection the second spring of the spring assembly becomes effective by virtue of the compression force stored therein by the movement of the plunger to reverse the direction of the plunger and effect a recoil movement of the fish hook to positively ensnare the fish on the hook. In other words, I provide two coacting springs within the body structure of the lure which are differentially effective. The main or stronger spring effects the projection of the plunger and the hook rearwardly at the same time that the tube is displaced rearwardly sufficient to dislodge the detent from latching engagement with the plunger, the said projecting movement operating to convert the kinetic energy of the first spring into potential energy stored in the second spring whereby the second spring becomes effective to reverse the movement of the hook for ensnaring the fish. When the lure of my invention is packaged and sold, the fish hook is prevented from ensnarement with any surrounding thing or means because the fish hooks, or barbs, are normally embedded within the tail section of the body structure. However, when the detent on the longer arm of the bell-crank moves out of the path of movement of the central plunger, and particularly the annular cam face which is provided thereon, the plunger and the hook associated therewith are free to move rearwardly for ensnaring the fish.

Referring to the drawings in more detail, reference character 1 designates the head section of the lure, while reference character 2 designates the tail section of the lure. These sections are molded from plastic material. The head section contains a central longitudinal cylindrical socket-like recess 3. The terminating opening of the socket-like recess on the end face 4 of head 1 is provided with a longitudinally extending pocket or recess 5 into which the lever arm 6 of the bell-crank device 7 which is pivoted at 8 in a recess 9 in the forward portion 10 of the tail section 2 may slideably pass. The lever arm 6 is longer than the lever arm 11 of the bell-crank 7. The lever arm 7 terminates flush with the exterior surface of the tail section 2 of the lure. The bell-crank device 7 has a curved or rounded surface 12 thereon which is adapted to roll on the wall of recess 9 sufficiently to enable lever arm 6 to swing outwardly when the end 4 of head section 1 and forward portion 10 of tail section 2 are moved apart sufficiently for the lever arm 6 to clear the pocket or recess 5 as shown more clearly in Figs. 3, 5, 6, 7, and 9. By reason of such slight orientation to which the bell-crank 7 is subject, the detent 14 carried thereby may be moved outwardly through the recess 15 in the wall of the slideable tube 16 sufficiently to enable the detent to be displaced from the position illustrated in Figs. 6 and 7 to the position illustrated in Fig. 5.

The tube 16 which is slideable in the head section 1 is slotted at 17, and there is a set screw 18 which extends through head section 1 and is provided with a projecting finger 19 which extends through slot 17 in tube 15 and forms a key or limit stop for confining the linear movement of the tube 16 between the limits shown in Figs. 7 and 8 on the one hand and Figs. 5, 6, and 9 on the other hand. The tube 16 is solidly supported in tail section 2 and is lineally movable, as heretofore explained, in head section 1.

The tube 16 serves as a housing for the plunger 20 which consists of a piston-like head 21 slideable within tube 16 and terminating in a tapered or cam-like annular face 22. The plunger 20 connects at its terminating end to the double fish hook represented at 23 having a pair of oppositely extending barbs 24 and 25. These barbs fit within protective recesses 26 and 27 in the terminating end of the tail section 2 as shown more clearly in Figs. 1, 6, 7 and 8. The plunger 20 carries a circular disc 28 thereon which serves as a confining stop or abutment against which coil spring 29 is effective. The coil spring 29 is disposed between the end wall 30 of the interior of the tail section 2 and the stop or abutment 28. A main spring 31 is provided between a diametrically extending stop spring 32 carried interiorly of tube 16 and the end of the piston 21 of the plunger 20. The main spring 31 is more powerful than the coil spring 29. The main spring 31 causes the rearward projection of plunger 20 and the hooks 23 while the auxiliary spring 29 hereafter referred to as a second spring, serves to effect the recoil movement of the hooks 23.

A fish designated at 33 while tugging at the tail section 2, exerts a rearward force on tail section 2 tending to draw tube 16 out of head section 1, separating tail section 2 from head section 1 for the limited distance designated by the separation of end face 4 of head section 1 and forward portion 10 of tail section 2 as shown in Figs. 3, 5, 6, and 9. During this movement the auxiliary or second spring 29 is compressed as represented in Fig. 9 and the longer lever arm 6 of bell-crank device 7 is moved out of pocket 5, thus freeing the end of the longer lever arm 6, from the protection of the pocket 5, as illustrated in Fig. 9 so that lever device 7 is capable of orienting to move detent 14 out of the path of the annular cam-face 22 of piston 21, thereby allowing plunger 20 to be projected rearwardly by the action of spring 31 which is sufficiently powerful to overcome the energy of spring 29. Plunger 20 continues to move as illustrated in Fig. 5 from the latched position shown in Fig. 6, thereby projecting hooks 23 into the mouth of the fish 33. The hooks shoot rearwardly at such velocity that it is not practicable to detect this movement by eye. Actually the hooks 23 shoot rearwardly about ½ inch further than one might be led to believe by observation because the potential energy stored up in auxiliary or second spring 29 from the kinetic energy released by spring 31 overcomes the rearward force to reverse the movement of the hooks 23 so that the hooks 23 engage the mouth of the fish positively as the fish tends to withdraw and thereby eliminates the possibility of escape of the fish from the hooks.

The lure may be freed of the fish and placed back into operation as represented in Fig. 4 where pressure is applied to the hooks 23 and the tail section 2 to restore the lure into the latched position shown in Figs. 1, 2, 7, and 8.

The head section 1 may be provided with suitable stabilizing means such as the fin 34 and the fish line may be connected to the eyelet 35 embedded in the head section 1 of the lure. Where the lure is used for surface fishing and in shallow water fishing, where there are a minimum of obstructions such as seaweed and the like, I may employ an arrangement of propeller 36 on a member 37 projecting forwardly from head section 1 and terminating in an eyelet 38 to which the fish line 39 connects. The rotation of propeller 36 serves as an attraction for the fish. Added embellishments may be applied to the body structure of the lure to increase the attractiveness of the device to the fish such as the eye representations shown at 40.

While I have described my invention in certain of its preferred embodiments, I realize that modifications may be made and I desire that it be understood that no limitations upon my invention are intended other than may be imposed by the scope of the appended claims.

What I claim as new and desire to secure by Letters Patent of the United States, is as follows:

1. An artificial lure for fish comprising a streamlined body structure, an axially slidable plunger within said body structure, the rearward portion of said body structure including an axial bore therein through which said plunger is adapted to slide, a fish hook carried by said plunger and a differential spring assembly within said body structure for differentially acting upon said plunger, means for latching said plunger in a position in which said fish hook is maintained in a position overlapping the rearward portion of said body structure and means for releasing said aforesaid means whereby said differential spring assembly acts differentially upon said plunger for projecting said fish hook rearward of said body structure, and in which said body structure includes a forwardly disposed head aligned with the rearward portion of said body structure and wherein said head has an axially extending bore therein, said rearward portion supporting a hollow tubular member which slidably projects into the bore in said head, means extending through said head and engaging said tubular member for limiting the displacement of said tube within said head, a bell crank device pivotally mounted in said rearward portion and having a lever arm thereon carrying a laterally extending detent projectable through a recess in the wall of said tubular member and into the path of said slidable plunger, said head having a recess therein forming a pocket for receiving said lever member and normally confining said bell crank device to a position in which the detent thereon forms a latch with respect to said slidable plunger for restraining said plunger in a position in which said hook is maintained in overlapping relation to the terminating end of the rearward portion of said body structure preparatory to a displacement of said bell crank device to a position in which said slidable plunger is released whereby said spring assembly is rendered effective for projecting said fish hooks rearwardly beyond the end of said rearward portion of said body structure.

2. An artificial lure for fish comprising a streamlined body structure, an axially slidable plunger within said body structure, the rearward portion of said body structure including an axial bore therein through which said plunger is adapted to slide, a fish hook carried by said plunger and a differential spring assembly within said body structure for differentially acting upon said plunger, means for latching said plunger in a position in which said fish hook is maintained in a position overlapping the rearward portion of said body structure and means for releasing said aforesaid means whereby said differential spring assembly acts differentially upon said plunger for projecting said fish hook rearward of said body structure, and in which said body structure also includes a head, and wherein said rearward portion has the axial bore therein lined by a hollow tube axially disposed therein and within which said plunger slides and said head containing a bore into which said hollow tube is slidably displaceable, means in said head for confining the displacement of said tube whereby said rearward portion and said head may be shifted axially with respect to each other, said slidable plunger including a piston-like head on one terminating end thereof and having an annular abutment adjacent the other end thereof and wherein said differential spring assembly consists of two separate springs, one of said springs being confined between one end of said piston-like head and a fixed position adjacent one end of said hollow tube, and where the other of said springs is located between the interior end of said rearward portion which carries said hollow tube and the annular abutment on said slidable member, said springs acting successively upon said slidable member for controlling the movement of said hook.

3. An artificial lure for fish comprising a head section and a tail section, said head section having an axial bore extending into one end thereof, said tail section having a tubular member mounted therein and slidably movable in the bore in said head section, means in said head section for restricting the movement of said tubular member therein, a stop carried by said tubular member in a position adjacent the end thereof which extends into said head section, a slidable plunger disposed axially within said tubular member and terminating in a piston-like head, said slidable plunger having a cylindrical shank thereon projectable through an axial bore in the rearward portion of said tail section, a fish hook connected with the terminating end of said shank and normally disposed in overlapping protective relation with the rear end of said tail section, an annular abutment carried by said shank in a position intermediate the connection of said fish hook with the end of said shank and the said annular abutment on said shank, a main spring disposed between the end of the piston-like head on said slidable plunger and the abutment within said tubular member, an auxiliary spring disposed between the annular abutment on said shank and the interior end wall of said tail section for differentially re-acting upon said slidable plunger and latching means coacting with the adjacent ends of said sections and including means extending through said tubular member and in the path of the piston-like head on said slidable plunger for controlling the ejection of said hook rearwardly of said tail section.

4. An artificial lure for fish as set forth in claim 3 in which said main spring exceeds in compression strength the compression strength of said auxiliary spring and wherein said main spring in effecting displacement of said slidable plunger stores potential energy in said auxiliary spring while rearwardly moving said fish hook and wherein said auxiliary spring operates to move said slidable plunger forwardly for reversing the direction of movement of said fish hook with respect to said tail section subsequent to the dissipation of kinetic energy by said main spring.

5. An artificial lure for fish comprising a head section and a tail section, a tubular member mounted in said tail section and extending slidably into an axial bore in said head section, a slidable plunger mounted coaxially within said tubular member and having a shank extending through a bore in the terminating end of said tail section, a hook carried by the end of said shank and normally maintained in protective overlapping relation to the terminating end of said tail section, means in said head section limiting the movement of said tubular member and the tail section mounted therein with respect to said head section, a piston-like head carried by the end of said slidable plunger in a position interiorly of said tubular member, an abutment disposed within said tubular member spaced from the end of said piston-like head, a main spring disposed between said abutment and the end of said piston-like head, an annular abutment carried by said plunger intermediate said piston-like head and the terminating end of said plunger, an auxiliary spring disposed between said last mentioned annular abutment and the interior of said tail section, and latching means coacting with said head and tail sections and with said piston-like head for obstructing the movement of said piston-like head while said head and tail sections are maintained in end-to-end abutment while releasing said plunger member for control of the movement of said hook rearwardly of said tail section, said main spring operating differentially with respect to said auxiliary spring whereby said main spring projects said hook rearwardly of said tail section and wherein said auxiliary spring operates as a recoil device for reversing the movement of said hook for movement forwardly in the direction of said tail section.

(References on following page)

References Cited in the file of this patent

UNITED STATES PATENTS

| | | |
|---|---|---|
| 945,091 | Hanel | Jan. 4, 1910 |
| 2,517,844 | Cooney | Aug. 8, 1950 |
| 2,589,343 | Cieslik | Mar. 18, 1952 |
| 2,670,558 | Prentice | Mar. 2, 1954 |
| 2,690,025 | Petty | Sept. 28, 1954 |
| 2,700,842 | Lehmann | Feb. 1, 1955 |
| 2,722,764 | Juhrend | Nov. 8, 1955 |
| 2,729,013 | Chandler | Jan. 3, 1956 |